June 18, 1940.  S. ZULLO  2,205,077

ELECTRICAL MOTOR FOR TIMING MECHANISMS

Filed March 31, 1939

Samuel Zullo
INVENTOR.

BY Ivan E. A. Konigsberg
ATTORNEY.

Patented June 18, 1940

2,205,077

UNITED STATES PATENT OFFICE 2,205,077

ELECTRICAL MOTOR FOR TIMING MECHANISMS

Samuel Zullo, Jersey City, N. J.

Application March 31, 1939, Serial No. 265,120

1 Claim. (Cl. 172—278)

This invention relates to improvements in synchronous electric motors especially well adapted for operating clocks, timing mechanisms and other like devices. One object of the invention is to provide a small compact thin or flat synchronous motor operating at relatively slow speed, comprising but a few parts which are easily and cheaply manufactured and assembled. Another object of the invention is to provide a synchronous motor in which the torque is easily and quickly increased by a mere addition of similar parts to the stator and to the rotor, the motor always operating as a synchronous motor. Still another object is to construct the motor so that its synchronism is not affected by changes in the voltage within reasonable limits. Another object is to provide a motor which starts instantly and always in synchronism under normal loads. Still another object is to so construct the motor that it, if stopped by an overload, will automatically resume its synchronous speed when the load is removed. Another object is to provide a synchronous motor capable of running at uniform speed which latter feature is obtained chiefly by providing a spoked rotor having a relatively heavy rim as distinguished from solid disk rotor. I have found that a rotor thus constructed rotates at a uniform speed, is selfstarting and evenly balanced. It has long wear and slippage is eliminated. The current consumption is very low.

Another object of the invention is to provide a rotor constructed in a novel manner whereby accuracy and low cost of manufacture is obtained, and the use of special fastening means for the parts of the rotor is eliminated.

Accordingly the invention is embodied in synchronous electric motor arranged and constructed as hereinafter set forth and as illustrated in the acompanying drawing in which Fig. 1 is a side elevation of a synchronous electric motor embodying the invention.

Figure 1:
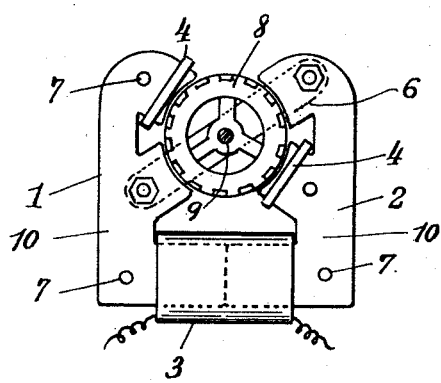
Figure 2:
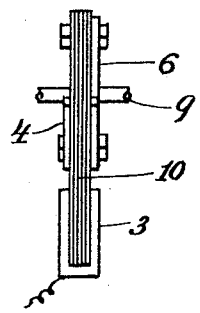
Fig. 2 is an edge view thereof looking from the right of Fig. 1.

Referring to Figs. 1 and 2 the motor comprises the stator 1, 2 having the coil 3 and provided with copper pieces 4, 4 forming the usual Sheridan bridge. The two legs of the stator are held together by any suitable framework such as is indicated at 6. 7 indicates holes for bolts whereby to mount the motor on suitable framework which may also support whatever mechanism which is to be operated by the motor. The latter and such framework is not shown. The rotor 8 is mounted upon and drives a shaft 9 which in turn will drive such mechanism. The stator is constructed of laminae 10.

Figure 3:
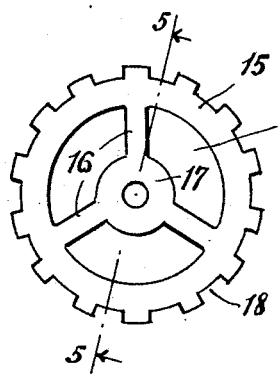
Fig. 3 is a view of one of the laminae of which the rotor is constructed.
Figure 4:
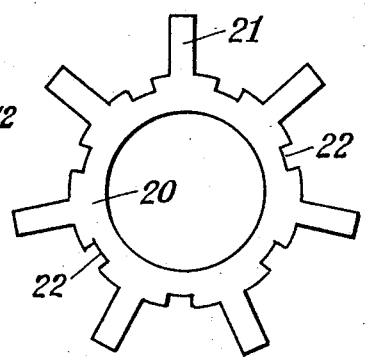
Fig. 4 is a view of the outside copper laminae of the rotor and which serves to hold the rotor parts together.

The rotor 8 is constructed of as many laminae 12 as may be required for the work to be performed by the rotor. Each laminae is in the form of a disk or wheel as shown in Fig. 3 comprising a rim 15, spokes 16 and a hub 17. The edge of the rim is formed with a plurality of slots or recesses 18. The rotor laminae are assembled and held together by two outer rotor copper disks. One of these is shown in Fig. 4 and consists of a rim 20 from which extends radial arms 21. Between these arms the edge of the rim 20 is provided with slots or recesses 22. The depth of the slots 18 in Fig. 3 and of the slots 22 in Fig. 4 is equal to the thickness of the copper laminae 20.

The rotor is assembled as follows. A suitable number of iron laminae 15 are placed one upon the other with the slots 18 in registry. Then one copper disk 20 is placed on one side of these assembled iron laminae with the arms 21 and slots 22 in registry with the slots 18. Then the arms 21 are bent in over the edge of the laminae 15 and pressed down into the slots 18. The extreme ends 25 of the arms 21 are bent down upon the other side of the laminae 15 and thus form hooks gripping the laminae 15 on both sides, the hooks being countersunk in the slots 18.

Another copper disk 20 is placed on the opposite side of the assembled iron laminae and its arms 21 are bent in over the laminae in the opposite direction and in the same manner.

Figure 5:
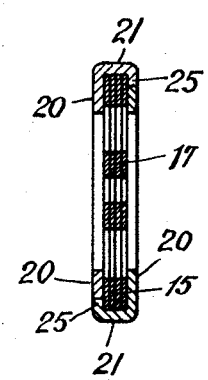
Fig. 5 is a sectional view of the assembled rotor taken on the line 5—5 of Fig. 3.

As shown in Fig. 5 the rotor is now assembled and ready to be mounted in position. It consists of a number of iron disk laminae held together by two outer copper disks by means of hooks formed by the radial arms 21 of the copper disks which arms are bent in over the iron laminae, embedded or countersunk in the slots 18, the ends of said arms being still further bent over and seated or fitted within the corresponding slots 22 of the copper disk upon the opposite side of the rotor.

The iron and copper disks wheels may be stamped out in great number and cut from dies thus insuring accurate and inexpensive mass production. The assembly is made quickly and easily assuring firm contact between the laminae and without the use of bolts or other fastening means. The motor is readily made in different sizes by merely varying proportionally the number of laminae in the rotor and stator, increasing the length of the arms 21 in the outer keeper disk and varying the coil to suit.

I claim:

A rotor for a synchronous electric motor as described consisting of a plurality of spoked iron disk formed laminae and two outer identical copper rings, one on each side of said laminae, each iron laminae comprising a hub, spokes and a rim with recesses in the edge of the rim, each copper ring having outwardly extending radial arms with recesses in the outer edge of said ring spaced between said arms, said arms and said recesses being spaced to register alternately with the recesses in the iron laminae, the arms of one of said copper rings being bent in one direction around the edges of the iron laminae and embedded in the corresponding recesses therein, the arms of the other copper ring being bent around the edges of said iron laminae in the opposite direction and likewise embedded in corresponding recesses therein, the extreme ends of said arms being bent to form clamping hooks around the edges of the laminae with said ends embedded in said spaced corresponding recesses in the other copper ring whereby said laminae and copper disks are held together solely by the clamping pressure of said hooks.

SAMUEL ZULLO.